Aug. 11, 1970  R. L. RUECKL  3,523,775
METHOD AND APPARATUS FOR TREATING SLAG
Filed July 10, 1967
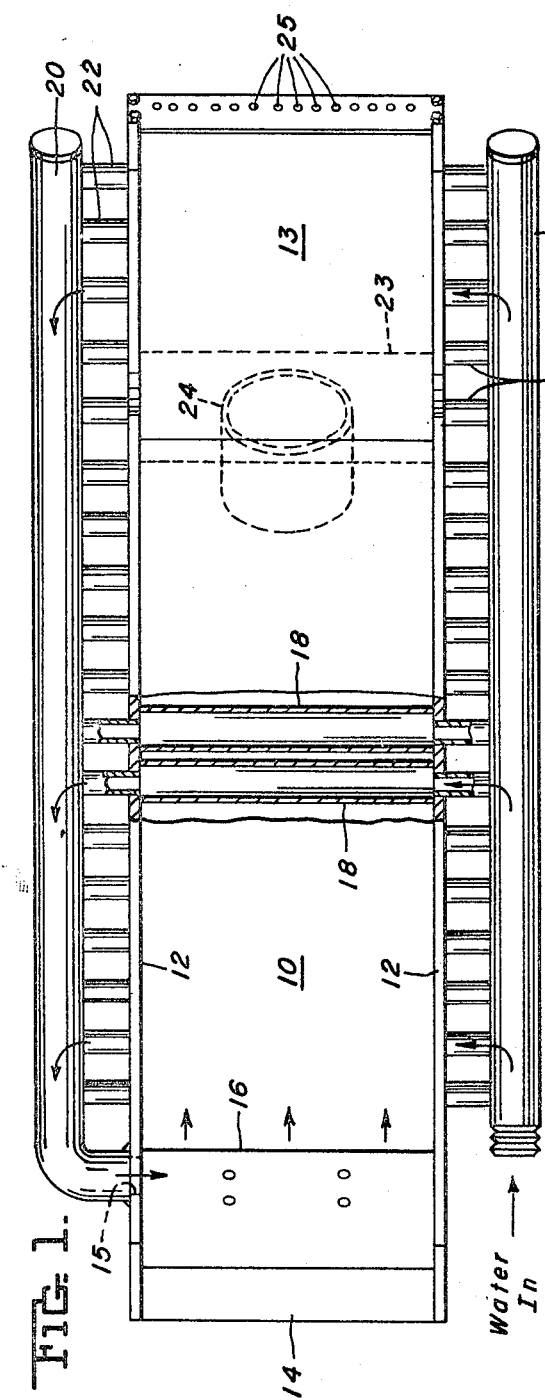
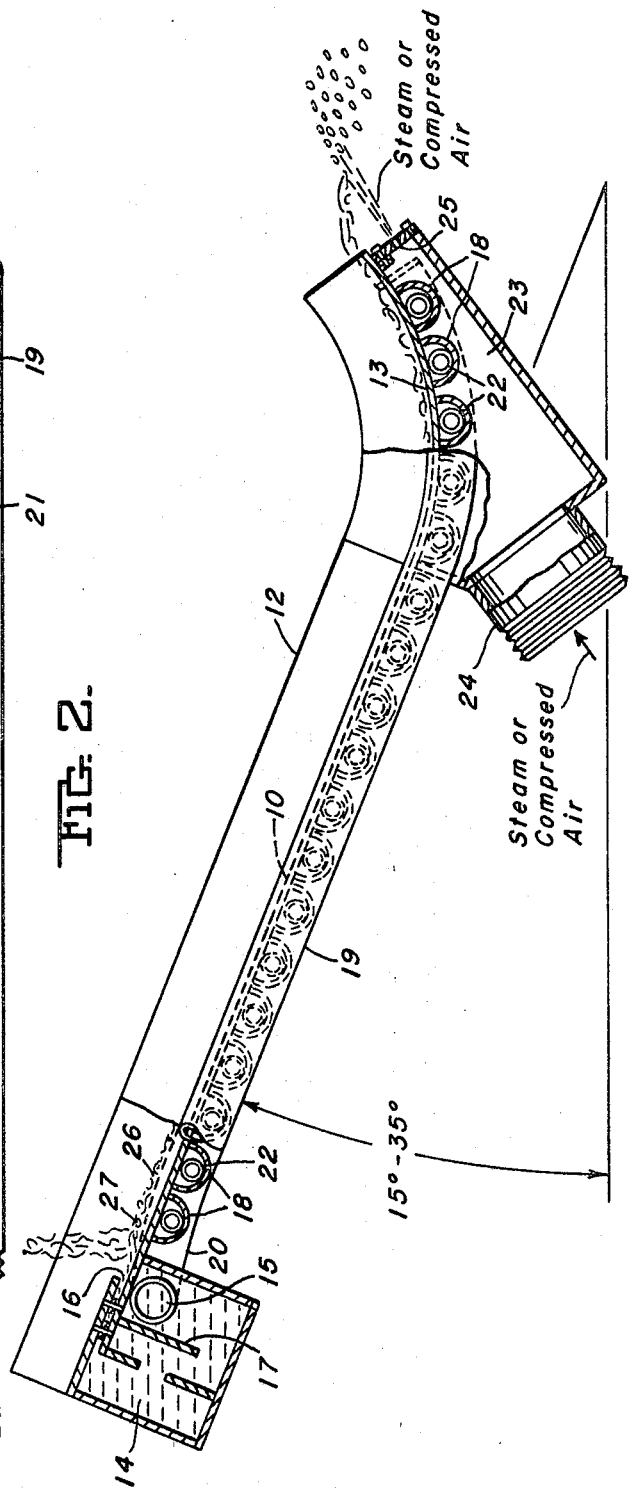
INVENTOR.
ROGER L. RUECKL
By Donald G. Dalton
Attorney 3,523,775
METHOD AND APPARATUS FOR
TREATING SLAG
Roger L. Rueckl, Franklin Township, Westmoreland County, Pa., assignor to United States Steel Corporation, a corporation of Delaware
Filed July 10, 1967, Ser. No. 652,044
Int. Cl. G03b 37/06
U.S. Cl. 65—19                                10 Claims

ABSTRACT OF THE DISCLOSURE

Method and apparatus for treating blast furnace slag to produce aggregates for use in concrete. Molten slag is poured over a sheet of water cascading down a sloping trough. Gas jets strike the slag as it discharges from the bottom of the trough. Slag forms lightweight aggregates of proper strength.

---

This invention relates to an improved method and apparatus for making slag aggregates, particularly for use in concrete.

Slag aggregates produced by previous methods are of angular shape and have rough porous surfaces. When used in concrete, such aggregates require a higher proportion of cement and water than premium aggregates of other materials. Slag aggregates commonly are produced by crushing and screening a clinker and hence are of a fine size, which limits their use to concrete block and excludes them from the increasing market in structural concrete.

An object of the present invention is to provide an improved method and apparatus for producing shaped lightweight slag aggregates which have an impermeable surface.

A more specific object is to provide a method and apparatus of the foregoing type in which molten blast furnace slag passes over a cascading water stream and next encounters a gas stream all in a critical relation to obtain the desired product.

In the drawing:

FIG. 1 is a top plan view of the apparatus; and
FIG. 2 is a side elevational view, partly in section.

The apparatus comprises a shallow elongated metal trough formed of a bottom wall 10 and upstanding side walls 12. Ideally the trough width is about 8 to 12 inches and depth about 3 to 6 inches. The bottom wall 10 has a flat portion of a length at least 3 inches and ideally about 16 to 30 inches. I support the trough with the flat portion sloping about 15° to 35° to the horizontal. The trough has an upwardly curved portion 13 which extends from the lower end of the flat portion through an arc of about 30° to 80° and on a radius of about 6 to 10 inches. The upper end of the trough carries a water chamber 14 which has an inlet 15, an outlet 16 and baffles 17 therebetween. The outlet extends across the full width of the trough, and the baffles distribute water uniformly to all portions thereof. Preferably I weld a plurality of pipe sections 18 to the underside of the bottom wall 10 to circulate cooling water. Water supply and discharge manifolds 19 and 20 extend along opposite sides of the trough and communicate with the pipe sections 18 through short length pipes 21 and 22. I connect the upper end of the discharge manifold 20 to the inlet 15 to supply water to chamber 14. The curved portion 13 of the trough carries a gas chamber 23, which has an inlet 24 and a plurality of jet-type outlets 25 located about ¼ to 1 inch below and ½ to 1 inch behind the end of the trough.

According to the method of the present invention, I introduce water to chamber 14, preferably via the water-cooling system illustrated. The water-cooling system is not essential, but I prefer to include it to prolong the life of the trough. Water discharges from the outlet 16 across the full width of the trough and cascades down the trough in the form of a sheet 26 which covers the bottom wall 10. I pour a layer 27 of molten blast furnace slag over the water near the upper end of the trough. The slag may come directly from a blast furnace, although it may be transported to a site remote from the furnace. The water cools the slag, which forms a fluid foamed plastic mass as it proceeds down the trough. The upwardly curved portion 13 of the trough diverts the foamed slag upwardly. I introduce gas to chamber 23 via the inlet 24. The gas may be steam or compressed air, but I prefer steam since it is less costly. The gas issues from chamber 23 through the outlets in the form of jets which strike the slag as it discharges from the trough. The jets break the foamed mass of slag into discrete particles and project them through the air. Surface tension causes the foamed particles to develop a rounded configuration in flight. The aggregates should be carried away for cooling immediately, rather than being allowed to collect near the end of the trough.

To meet ASTM standards the maximum density of the product should be as follows:

|  | Pounds/cubic foot |
|---|---|
| Fine aggregate | 70 |
| Coarse aggregate | 55 |
| Combined aggregate | 65 |

To equal other premium aggregates in strength, the aggregate should show no more than 20 percent degradation in an abrasion test, which I conduct by placing 3 pounds of ¼-inch by 8-mesh aggregate and 3 pounds of 1-inch diameter grinding balls in a 9-inch long by 9¼-inch inside diameter ball mill and tumbling for 5 minutes at 75 r.p.m. I screen the tumbled product on an 8-mesh vibrator for 15 minutes. To obtain an aggregate which meets the foregoing density standards, I require blast furnace slag which has a sulfur content of at least 1.05 percent, or preferably 1.10 to 1.25 percent. To obtain an aggregate which meets the strength standards, the ratio of slag to water should be in the range of about 25 to 45 pounds of slag per gallon of water. The volume of water should not exceed that which can be evaporated by the heat of the molten slag. Theoretically I can use as much as 0.04 gallon of water per pound of slag at 2400 to 2600° F. (25 pounds per gallon). In practice there are heat losses which may necessitate the use of less water, down to as low as 0.022 gallon per pound of slag (45 pounds per gallon). If the flat portion of the trough slopes less than about 15°, the slag freezes in the trough. If it slopes more than about 35°, the slag does not cool sufficiently, and particles adhere to each other and form an unusable mass. The gas volume and pressure should be about 0.5 to 1.0 cubic feet per minute at 30 to 100 p.s.i.g. for each pound of slag processed per minute.

EXAMPLE 1

As a specific example to demonstrate how my invention works, I supplied molten blast furnace slag at a rate of 835 pounds per minute to my apparatus along with 25 gallons of water per minute. The slag had a sulfur content of 1.10 percent. I introduced steam at a rate of 50 pounds per minute at 55 p.s.i.g. I obtained an aggregate which had a bulk density of 50.8 pounds per cubic foot and an abrasion index of 17.9.

EXAMPLE 2

I supplied molten blast furnace slag at a rate of 1060 pounds per minute to my apparatus along with 25 gallons of water per minute. The slag had a sulfur content of 1.55 percent. I obtained an aggregate which had a bulk density of 63.5 pounds per cubic foot and an abrasion index of 11.0.

Both the foregoing examples represent short runs. Longer term operation might be expected to produce aggregates of even better abrasion index. While an abrasion index of 20 is acceptable, preferably the figure should be lower.

While I have shown and described only a single embodiment of my invention, it is apparent modifications may arise. Therefore, I do not wish to be limited to the disclosure set forth but only by the scope of the appended claims.

I claim:

1. A method of making slag aggregates comprising cascading a sheet of water down a trough which has a flat portion sloping at an angle of about 15° to 35° to the horizontal and an upwardly curved portion extending from the lower end of said flat portion, pouring molten blast furnace slag which has a sulfur content of at least 1.05 percent over the water near the top of said flat portion, the ratio of slag to water being in the range of about 25 to 45 pounds of slag per gallon of water, the volume of water not exceeding that which can be evaporated by the heat of the molten slag, said curved portion diverting the slag upwardly as it discharges therefrom, and striking the slag with gas jets as it discharges from said curved portion to break the mass of slag into discrete particles which develop a rounded configuration in flight.

2. A method as defined in claim 1 in which the water sheet extends uniformly across the full width of the trough.

3. A method as defined in claim 1 in which the sulfur contents is 1.10 to 1.25 percent.

4. A method as defined in claim 1 in which the gas is selected from the group which consists of steam and compressed air and has a volume of 0.5 to 1.0 cubic feet per minute at 30 to 100 p.s.i.g.

5. A method as defined in claim 1 in which the water used to form the sheet first is used to cool the trough from the underside.

6. An apparatus for making slag aggregates comprising a trough which has a flat portion sloping 15° to 35° from the horizontal and an upwardly curved portion extending from the lower end of the flat portion, the flat portion of said trough being shaped to receive molten slag at its upper end and to carry the slag downwardly to said curved portion, said curved portion being shaped to divert the slag upwardly as it discharges from the trough, a water chamber carried by the upper end of said trough and having an inlet and an outlet, said outlet extending the full width of said trough, and a gas chamber carried by the curved portion of said trough and having an inlet and a plurality of jet outlets, said jet outlets being directed to strike slag discharging from said curved portion and break the slag into discrete particles.

7. An apparatus as defined in claim 6 further comprising a series of baffles mounted in said water chamber to assist in distributing water uniformly across said first-named outlet.

8. An apparatus as defined in claim 6 further comprising water-cooling means fixed to the underside of said trough, and means connected to said cooling means for introducing and discharging cooling water.

9. An apparatus as defined in claim 8 in which the means for discharging cooling water from said cooling means is connected to said first-named inlet.

10. An apparatus as defined in claim 8 in which said cooling means includes a plurality of transverse pipe sections welded to the underside of said trough, and the means for introducing and discharging water to said cooling means includes supply and discharge manifolds at opposite sides of said trough, and pipes extending between said manifolds and said pipe sections, said discharge manifold being connected to said first-named inlet.

References Cited

UNITED STATES PATENTS

| 643,856 | 2/1900 | Wuth | 106—103 |
| 2,044,450 | 6/1936 | Schol | 65—141 |

S. LEON BASHORE, Primary Examiner

R. L. LINDSAY, Jr., Assistant Examiner

U.S. Cl. X.R.

60—21, 141; 106—103